United States Patent [19]

Utagawa et al.

[11] 4,336,450
[45] Jun. 22, 1982

[54] FOCUS DETECTING APPARATUS

[75] Inventors: Ken Utagawa; Akira Ogasawara, both of Yokohama; Hiroshi Shirasu; Kunihisa Hoshino, both of Kawasaki, all of Japan

[73] Assignee: Nippon Kogaku K.K., Tokyo, Japan

[21] Appl. No.: 112,350

[22] Filed: Jan. 15, 1980

[30] Foreign Application Priority Data

Jan. 20, 1979 [JP] Japan .................................. 54-5270
Mar. 16, 1979 [JP] Japan .................................. 54-30046

[51] Int. Cl.³ .............................................. G01J 1/20
[52] U.S. Cl. ..................................... 250/201; 250/204
[58] Field of Search ............... 250/201, 204, 208, 209, 250/578; 354/25; 356/4, 5

[56] References Cited

U.S. PATENT DOCUMENTS

| | | | |
|---|---|---|---|
| 3,844,658 | 10/1974 | Gela et al. | 356/4 |
| 3,875,401 | 4/1975 | Stauffer | 250/209 |
| 4,010,479 | 6/1975 | Nobusawa | 250/204 |
| 4,078,171 | 3/1978 | Stauffer | 250/201 |

Primary Examiner—David C. Nelms
Attorney, Agent, or Firm—Fitzpatrick, Cella, Harper & Scinto

[57] ABSTRACT

A focus detecting apparatus comprises first means for forming phase outputs from said first and second photosensor arrays of phases respectively corresponding to the relative positions of said first and second photosensor arrays with respect to the light images thereon; second means for comparing the output corresponding to the amount of light entering said first photosensor array with the output corresponding to the amount of light entering said second photosensor array and forming a correlation output corresponding to said comparison; third means for forming outputs corresponding to the sharpness of light images on said photosensor arrays from the outputs from said arrays; and processing means for generating a synthesized output signal representing the focus state of said objective lens with respect to the object from the aforementioned phase outputs, correlation output and sharpness outputs.

9 Claims, 13 Drawing Figures

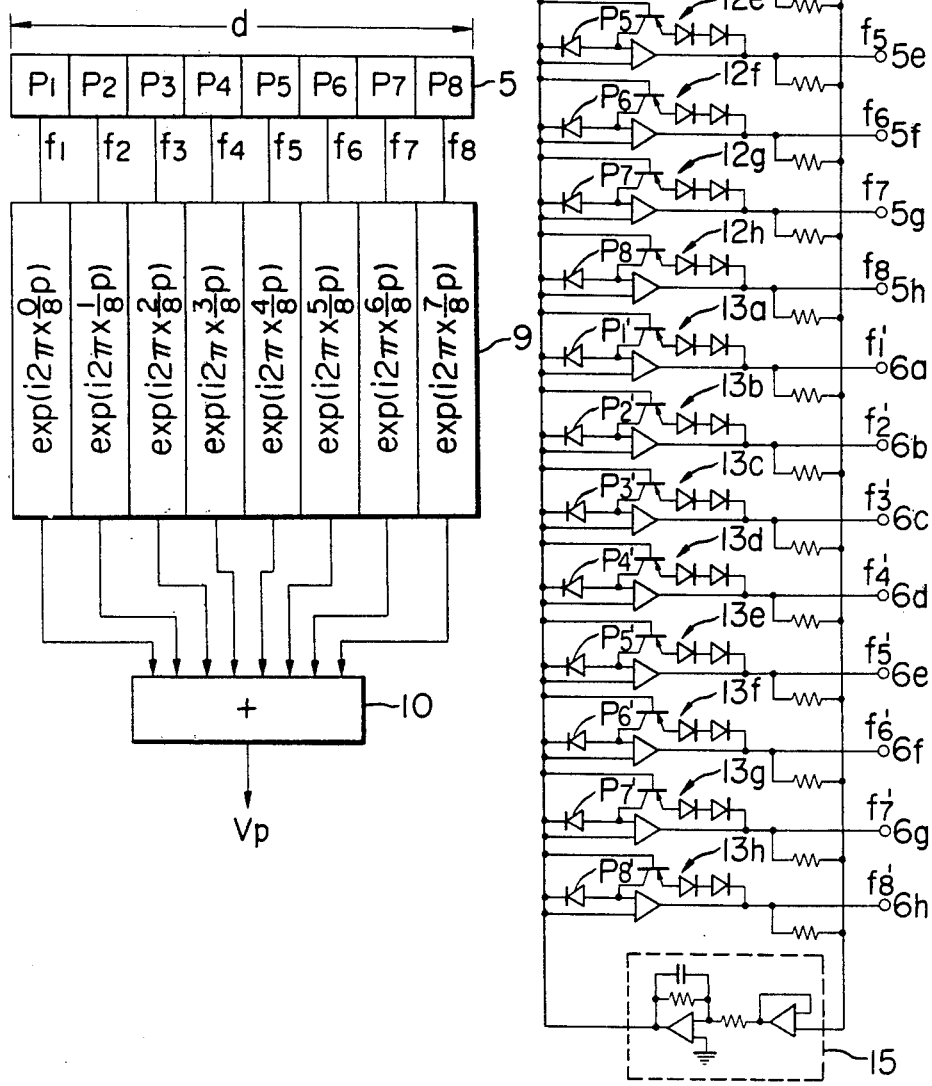

FOCUS DETECTING APPARATUS

BACKGROUND OF THE INVENTION

1. Field of the Invention

The present invention relates to a focus detecting apparatus for detecting the in-focus state of an objective lens for a camera or a similar optical equipment.

2. Description of the Prior Art

The present applicant already disclosed, in his U.S. Pat. No. 4,264,810 and corresponding German patent application No. P2856233.6, a focus detecting apparatus in which optical images of an object to which the objective lens is to be focused are formed on a pair of photosensor arrays in such a manner that the relative positions of said images on said arrays are changed according to the amount of the shift of the objective lens from the focused position thereof, then components corresponding to a particular spatial frequency of said optical images are extracted from the photoelectric output signals from said arrays and the relative displacement of said images on said arrays is determined from the phase difference between said extracted components of a particular spatial frequency, thus detecting the focus position of the objective lens. Although such apparatus is satisfactorily functional under ordinary circumstances, it is still defective in that a significantly unfocused state wherein the optical image is displaced from the focused position by an amount equal to a cycle of the extracted spatial frequency also provides a zero phase difference, thus leading to an erroneous identification of the focused state, and also in that said apparatus renders it difficult to identify whether the objective lens is focused in front of or behind the object.

Also Japanese Patent Laid-Open No. 39543/1975, discloses a focus detecting apparatus in which the optical images of an object are respectively formed on a pair of photosensor arrays, then the absolute value of the difference of photoelectric outputs from each corresponding photoelectric element of said arrays is summed over the entire array to obtain a correlation output, and the focused state of the objective lens is identified by minimizing said correlation output. In such apparatus, however, the correlation output can assume various shapes as it is not normalized. Consequently, in order to detect the in-focus position, it becomes necessary to move the objective lens at least once from a position corresponding to the nearest object distance to a position corresponding to the infinite object distance.

SUMMARY OF THE INVENTION

The object of the present invention to provide an improved focus detecting apparatus.

Another object of the present invention is to provide a focus detecting apparatus eliminating the drawbacks of the conventional apparatus.

According to the present invention, the above-mentioned objects are achieved by a focus detecting apparatus comprising:

(a) first means for forming phase outputs from said first and second photosensor arrays of phases respectively corresponding to the relative positions of said first and second photosensor arrays with respect to the light images thereon;

(b) second means for comparing the output corresponding to the amount of light entering said first photosensor array with the output corresponding to the amount of light entering said second photosensor array and forming a correlation output corresponding to said comparison;

(c) third means for forming outputs corresponding to the sharpness of light images on said photosensor arrays from the outputs from said arrays; and (d) processing means for generating a synthesized output signal representing the focus state of said objective lens with respect to the object from the aforementioned phase outputs, correlation output and sharpness outputs.

BRIEF DESCRIPTION OF THE DRAWINGS

FIG. 3 is a block diagram of a spatial frequency component extracting circuit;

FIG. 4 is a circuit diagram showing a specific example of a photosensor array;

DESCRIPTION OF THE PREFERRED EMBODIMENTS

Figure 1:
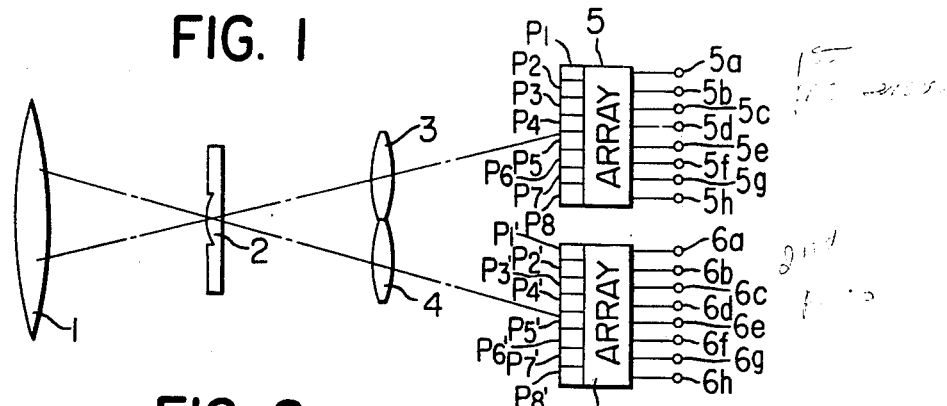
FIG. 1 is a schematic drawing showing the principle of the focus detecting apparatus.

Referring to FIG. 1, a field lens 2 is provided on a fixed focal plane of an objective lens 1 or a plane conjugate therewith. In case of a photographic camera, as the photographic film is positioned on said fixed focal plane, said field lens 2 is positioned in an optical path divided from the optical path of said objective lens 1. There are also provided photosensor arrays 5 and 6 (respectively referred to as first and second photosensor groups) in positions conjugate with the field lens 2 or the fixed focal plane of the lens 1 with respect to relay lenses 3 and 4. In the present embodiment the arrays 5, 6 are respectively composed of eight photosensor elements P1-P8 and P1'-P8'. The positional relationship between the arrays 5, 6 and the relay lenses 3, 4 is determined in such a manner that the light images of the object formed on said photosensor arrays 5, 6 by means of the objective lens 1 and the relay lenses 3, 4 have the same positional relationship to said arrays 5, 6 when said objective lens 1 is focused to said object. Consequently, in such in-focus state, each positionally corresponding pair of photosensor elements P1 and P1', ..., P8 and P8' of said arrays 5, 6 receive the same light intensity. In case the image of the object is formed by the objective lens in front of the field lens 2 (i.e. in case of forward focusing), the images formed on the photosensor arrays 5 and 6 respectively move downwards and upwards. On the other hand, in case the image formed by the objective lens 1 is positioned behind the field lens 2 (i.e. in case of backward focusing), the images on the photosensor arrays 5, 6 respectively move in the directions opposite to the foregoing case.

The arrangement of the photosensor elements of said arrays and the positional relationship thereof to the optical system are not limited to those shown in FIG. 1 but may be arbitrarily selected as long as at least one of the relative positions of an array with respect to the light image thereon and the relative position of the other array with respect to the light image thereon is variable in response to the change of the focus position of the objective lens 1. For example, the photosensor elements in each photosensor array need not be arranged in a linear form, and may be arranged intermittently with a certain distance therebetween instead of the illustrated close arrangement.

The photoelectric outputs of the photosensor elements P1-P8 of the array 5 are respectively amplified either linearly or logarithmically and generated as the electric output signals f1-f8 corresponding to said photoelectric outputs from the output ports 5a-5h of the array 5. Similarly, the photoelectric outputs of the photosensor elements P1'-P8' of the array 6 are produced as the electric output signals f1'-f8' from the output ports 6a-6h. In the following description, it is assumed that the corresponding electric output signals f1-f8 and f1'-f8' are obtained by logarithmic amplification of the photoelectric outputs.

Figure 2:
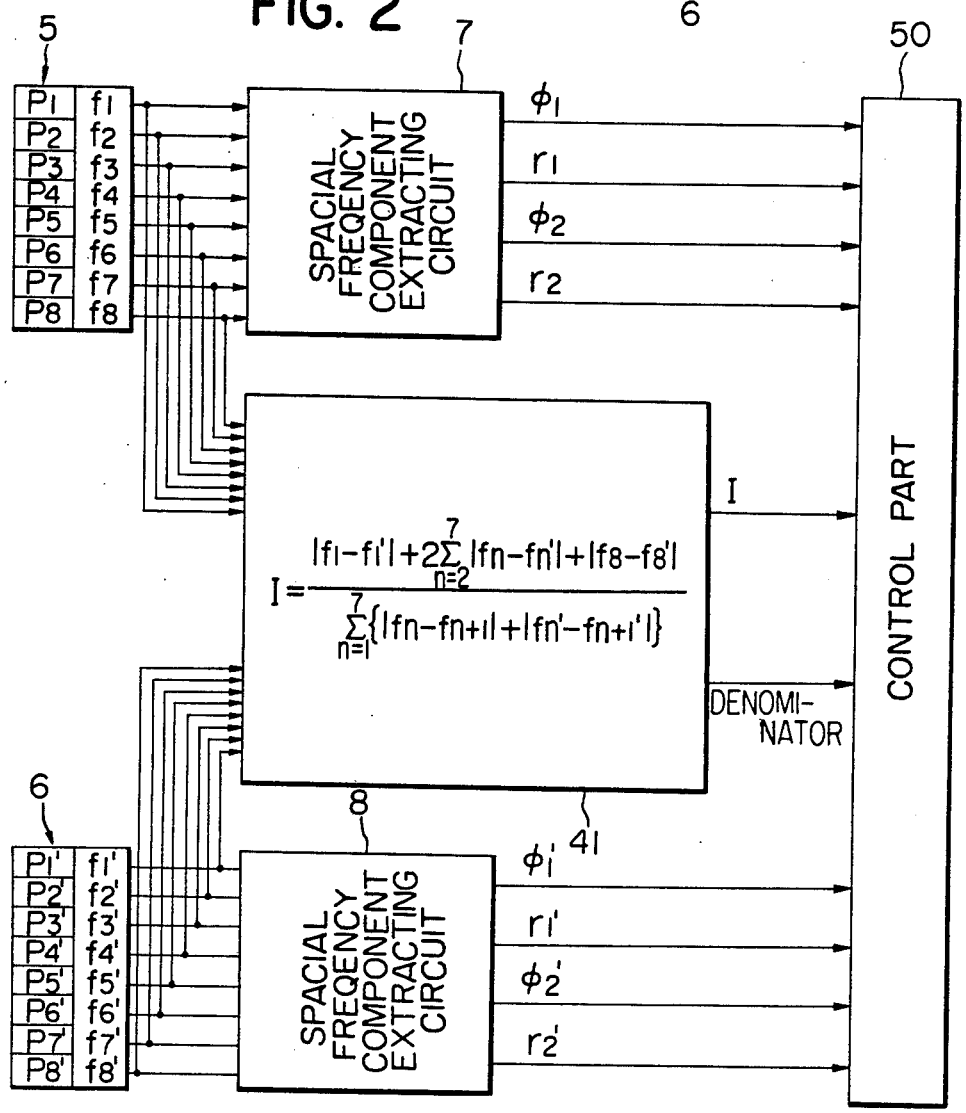
FIG. 2 is a block diagram of a signal processing circuit for a first embodiment of the focus detecting apparatus of the present invention.

In the following, there will be given an explanation as to how said electric output signals f1-f8 and f1'-f8' are processed. Referring to FIG. 2, a spatial frequency component extracting circuit 7 an example of which is disclosed in copending application Ser. No. 109,281, filed Jan. 3, 1980, extracts from said output signals f1-f8 a first electric signal V1 principally containing the information of a first spatial frequency component of the light image formed on said array 5 and a second electric signal V2 principally containing the information of a second spatial frequency component of a spatial frequency equal to a half of said first spatial frequency. Said second spatial frequency component is not limited to the above-explained example but may be arbitrarily selected so as to have a spatial frequency different from said first spatial frequency. The above-mentioned first electric signal V1 is a vector containing phase information $\phi 1$ variable in a determined manner in response to the displacement of the light image along the direction of photosensor arrangement in the array 5, and magnitude information r1 representing the magnitude of said extracted spatial frequency component. Similarly, the second electric signal V2 is a vector containing phase information $\phi 2$ and magnitude information r2. Another spatial frequency component extracting circuit 8 is the same as the above-explained circuit 7 and extracts first and second spatial frequency components from the electric output signals f1'-f8' of the array 6 to provide first and second electric signals V1', V2' which are vectors respectively representing said components and include phase information $\phi 1'$, $\phi 2'$ and magnitude information r1',r2'.

FIG. 3 shows the working principle of said extracting circuit, wherein the electric output signals f1-f8 corresponding to the photosensor elements P1-P8 are converted into vectors in a vectorizing circuit 9 by multiplying vectors $\exp(i2\pi \times 0p/8)$, $\exp(i2\pi \times p/8)$, . . . , $\exp(i2\pi \times 7p/8)$ which are graduated in succession by a phase difference of $2\pi p/8$. The output signals from said vectorizing circuit 9 are summed in an adding circuit 10, of which output Vp can therefore be represented as follows:

$$V_p = \sum_{n=1}^{8} v_n \cdot \exp(i2\pi \times (n-1)p/8).$$

Thus, in case p=1, the output V1 of said adding circuit 10 is a vector principally containing the information of a spatial frequency component of the light image having a spatial period equal to the longitudinal length d of the photosensor elements P1-P8 of the array 5, while in case p=2 or 3, the corresponding output V2 or V3 of the adding circuit 10 is a vector principally containing the information of a spatial frequency component having a spatial period equal to d/2 or d/3.

As a generalization, it is possible, by multiplying the electric output signals f1-$f_N$ respectively with vectors having a successive phase difference of $2\pi \times P/N$ by the vectorizing circuit 9 and summing the obtained results by the adding circuit 10, to obtain a vector principally containing the information of a spatial frequency component of a spatial period equal to the longitudinal length of N photosensor elements or equal to $\frac{1}{2}$, $\frac{1}{3}$, . . . thereof corresponding to a value of p=1, 2, . . . .

Figure 5:
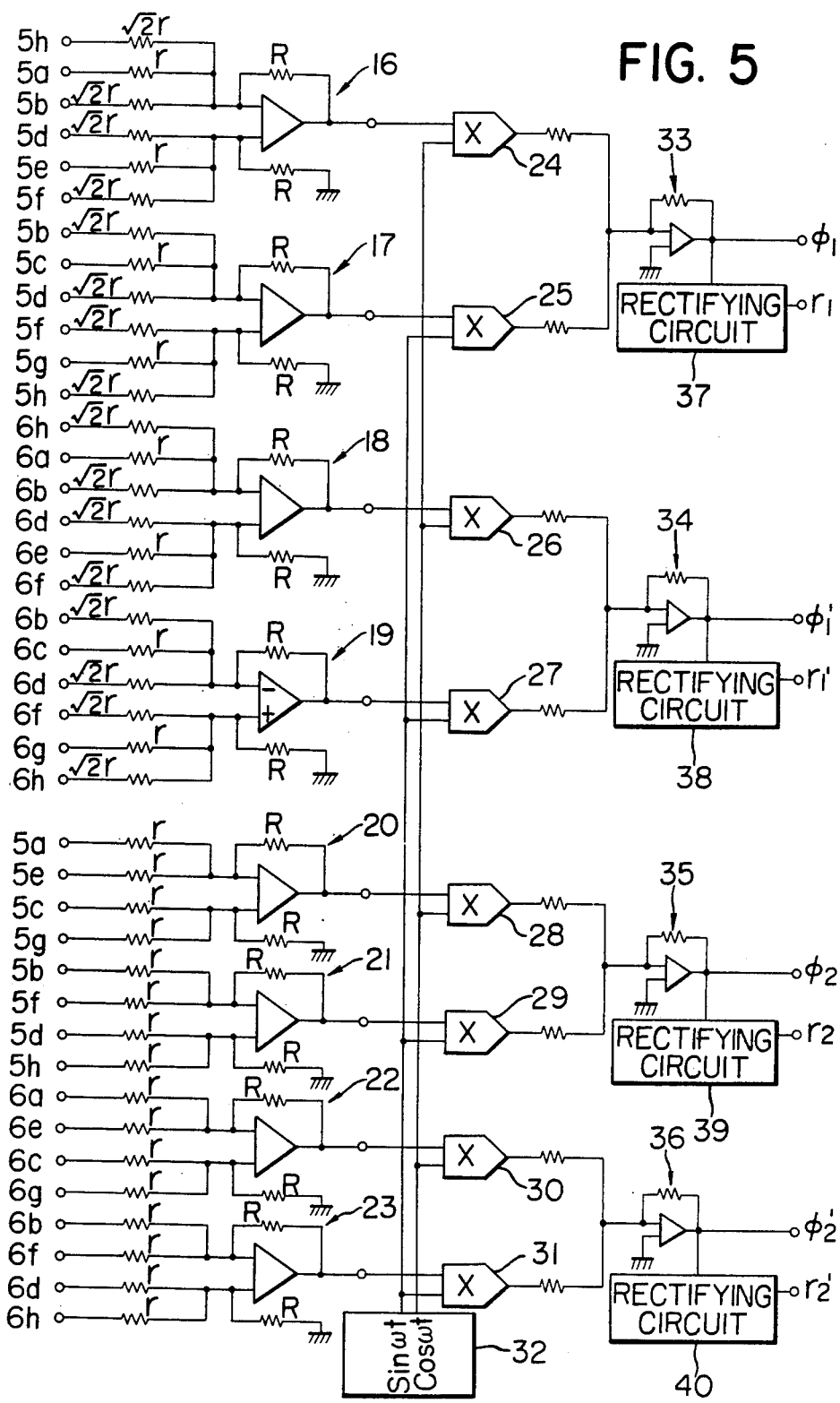
FIG. 5 is a circuit diagram showing a specific example of the spatial frequency component extracting circuit shown in FIG. 2.

FIGS. 4 and 5 show the examples of the arrays 5, 6 and the spatial frequency extracting circuits 7, 8.

Referring to FIG. 4, the photocurrents from the photodiodes P1-P8 and P1'-P8' of the arrays 5, 6 are converted into corresponding electric output signals f1-f8 and f1'-f8' proportional to the logarithm of the intensity of incident light by means of logarithmic converting circuits 12a-12h and 13a-13h composed of operational amplifiers and feedback transistors and diodes. A circuit 15 is provided for applying a feedback so as to render the average of said electric output signals f1-f8 and f1'-f8' equal to zero, in order to minimize the effect of errors in the vectors to be multiplied by the vectorizing circuit, or more specifically errors in the input resistance etc. in the differential amplifiers 16-23 shown in FIG. 5.

In the extracting circuit shown in FIG. 5, the terminals 5a-5h and 6a-6h are respectively connected to the terminals of the same symbols shown in FIG. 4. The vectorizing circuit multiplies the electric output signals f1-f8 and f1'-f8' with the vectors $\exp(i2\pi \times 0/8)$ . . . $\exp(i2\pi \times \frac{7}{8})$ in the form of x-components and Y-components thereof. A differential amplifier 16 multiplies the output signals f1-f8 from the array 5 with the x-components of said vectors and adding thus obtained results wherein the input resistances are selected proportional to the reciprocal of the x-components to be multiplied, whereby said differential amplifier 16 provides an output representing the x-component of the first electric signal V1 of the spatial frequency component having a spatial period d.

A differential amplifier 17 functions to multiply the output signal f1-f8 with the y-components of the above-mentioned vectors and adding thus obtained results to provide an output representing the y-component of said first electric signal V1. Also the differential amplifiers 18 and 19 perform the same functions on the output signals f1'-f8' as those conducted by the amplifiers 16, 17 to provide the x- and y-components of the first electric output signal V1'. In a similar manner, differential amplifiers 20, 21 provide the x- and y-components of the second electric signal V2 representing the spatial frequency component of a spatial period of d/2 with respect to the array 5, while differential amplifiers 22, 23 provide the x- and y-components of the second electric signal v2' with respect to the array 6.

Multipliers 24, 26, 28 and 30 respectively multiply the output signals from said differential amplifiers 16, 18, 20, and 22 with an AC signal cos ωt supplied from an oscillating circuit 32, while multipliers 25, 27, 29 and 31 respectively multiply the output signals from said differential amplifiers 17, 19, 21 and 23 with an AC signal sin ωt supplied from said oscillating circuit 32. Adders 33, 34 35 and 36 respectively add the output signals from the multipliers 24 and 25; 26 and 27;, 28 and 29; and 30 and 31 to provide the first electric signals V1 and V1', and the second electric signals V2 and V2', respectively having the aforementioned phases φ1, φ1', φ2 and φ2' and providing the aforementioned magnitude information r1, r1', r2 and r2' after rectification by rectifying circuits 37, 38, 39 and 40.

Figure 6A:
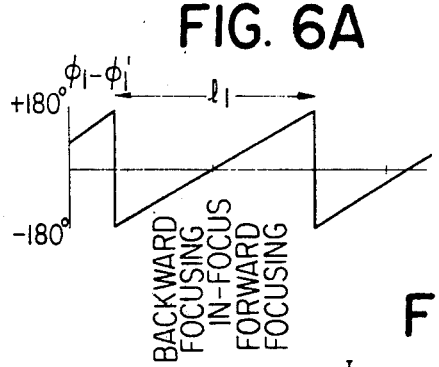
FIGS. 6A and 6B are charts showing the phase difference output signals.

Again referring to FIG. 2, the phase difference φ1-φ1' between the first electric signals V1 and V1' obtained from said spatial frequency component extracting circuit becomes zero when the objective lens is in the in-focus state, while it becomes for example positive or negative respectively in the forward focus state and in the backward focus state, with an amount corresponding to the amount of displacement of the lens from the in-focus position thereof, as shown in FIG. 6A.

Figure 6B:
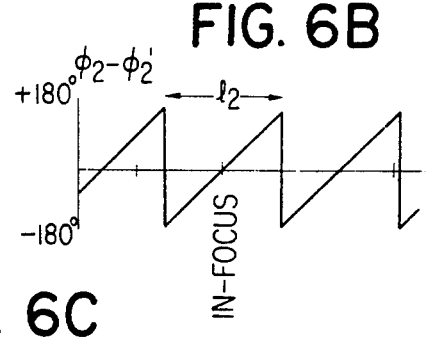
Figure 6C:
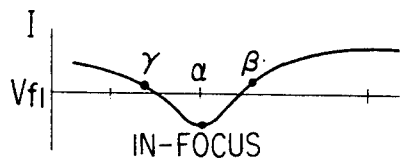
FIG. 6C is a chart showing the correlation output signal.

The phase difference φ2-φ2' of the second electric signals V2 and V2' shows a similar behavior as represented in FIG. 6B. However, as will be apparent from FIGS. 6A and 6B, the focus detection relying solely on said phase difference may lead to an erroneous result since the phase differences φ1-φ1' and φ2-φ2' become again zero in case the objective lens is significantly displaced from the in-focus position thereof. In order to prevent such error there is provided a correlation detecting unit 41 for detecting the presence of the objective lens in the vicinity of the in-focus position thereof by calculating a correlation function $$I = \{|f1 - f1'| + 2 \sum_{n=2}^{7} |fn - fn'| + |f8 - f8'|\}/ \sum_{n=1}^{7} \{|fn - f_{n+1}| + |fn' - f_{n+1}'|\},$$

which is normalized relying solely on the focus position of the objective lens and regardless of the distribution of the brightness since in case of a substantially uniform brightness distribution of the object the numerator and the denominator of said function become correspondingly smaller. More specifically, the function I becomes equal to zero in case the lens is located at the in-focus position since fi=fi' in this state to give a zero numerator while said function becomes equal to unity (1) in case of a forward or backward focus state wherein the image on the array 5 is displaced by one photosensor element with respect to the image on the array 6 as there stand the equations f2'=f1, f3'=f2, ..., f8'=f7 or f2=f1', f3=f2', ..., f8=f7' regardless of the brightness distribution of the object. In this manner said correlation function I is normalized at the in-focus position α, the forward focus position β wherein said images are mutually displaced by one photosensor element and the similar backward focus position γ as shown in FIG. 6C. Naturally such normalized correlation function I is not limited to the one explained in the foregoing but may take other forms, for example $$I' = \sum_{n=1}^{8} |fn - fn'|/(r1 + r1' + r2 + r2').$$

A further example may be found in copending application Ser. No. 109,282 filed Jan. 3, 1980.

Figure 7:
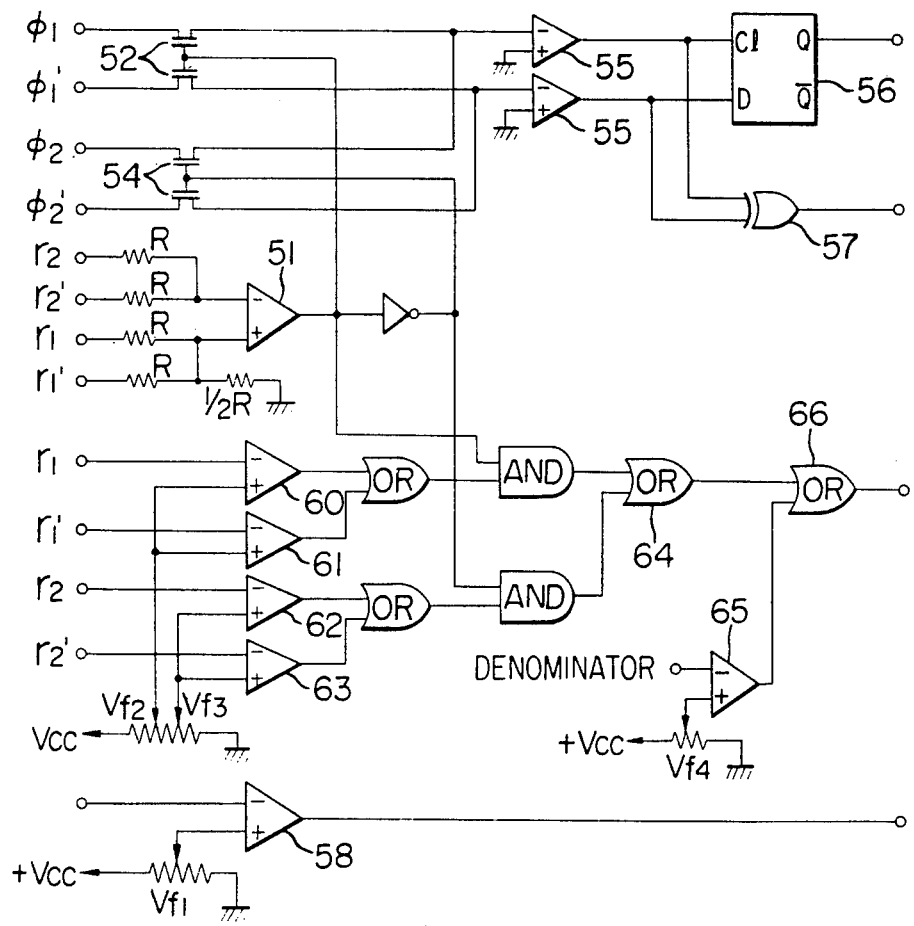
FIG. 7 is a circuit diagram showing a specific example of the control unit shown in FIG. 2.

In the following there will be given an explanation on a control part or unit 50 for selecting either the phase difference φ1-φ1' or the other phase difference φ2-φ2' for focus detection according to the brightness distribution of the object and identifying the reliability of said phase differences and of the correlation function I. Now referring to FIG. 7, a comparator 51 compares a half of the sum of the magnitude information r1 and r1' relating to the first spatial frequency component of the spatial period d with the sum of the magnitude information r2 and r2' relating to the second spatial frequency component of the spatial period d/2, and produces a high-level signal in case the former is larger, namely when the light image contains a larger amount of the first spatial frequency component to render FET's 52 conductive, while said comparator 52 generates a low-level signal in case the latter is larger to render FET's 54 through an inverter 53. A half of the sum of r1 and r1' is employed since the phase information on the second spatial frequency component has a higher precision in comparison with that of the first spatial frequency component. The AC signals φ1 and φ1' in case the FET's 52 are conductive or the AC signals φ2 and φ2' in case the FET's 54 are conductive are converted by a wave shaping circuit 55 into square waves, which are supplied then to a D-flip-flop 56 and an "or else" circuit 57. Said D-flip-flop 56 identifies the sign of the phase difference φ1-φ1' or φ2-φ2'. As explained in the foregoing, said sign represents the forward or backward focus state of the lens. Also said "or else" circuit 57 identifies the absolute value or magnitude of said phase difference, indicating the amount of displacement of the lens from the in-focus position thereof. Consequently, the in-focus state of the lens, or the forward or backward focus state thereof as well as the amount of displacement can be identified from the output signals from said flip-flop 56 and said circuit 57.

A comparator 58 compares the normalized correlation function output I with a standard level V_fl and generates a low-level output signal in case the former is smaller. Said standard level V_fl is selected, as shown in FIG. 6C, in such a manner that the phase difference φ1-φ1' or φ2-φ2' always remains in a normal range l1 or l2 as long as the correlation function I remains below said standard level. Consequently, in case the output of the comparator 58 is in the low-level state, it is guaranteed that the objective lens is located in the vicinity of the in-focus position and that the output signals from said D-flip-flop 56 and from the "or else" circuit 57 are normal focus detection signals.

In case of an object having a substantially uniform brightness distribution and giving light images scarcely containing the first and second spatial frequency components on the arrays 5, 6, such as a blackboard, the phase differences φ1-φ1' and φ2-φ2' are strongly affected by the noises and do no longer represent faithfully the change in the relative positions of the light images on the arrays 5, 6. Thus, in such case, said phase differences cannot be utilized as an exact focus detection signal for the objective lens. In such case, the magnitude information r1, r1', r2 and r2' naturally become smaller. Thus comparators 60 and 61 identify whether the information r1 and r1' are larger than a determined level Vf2 while comparators 62 and 63 identify whether the information r2 and r2' are larger than a determined level Vf3, and an OR gate 64 produces a low-level signal only in case all said information are in excess of said determined levels. Said low-level signal from the OR gate 64 indicates that the output signals from said flip-flop 56 and said circuit 57 are in the normal ranges.

Also in case the denominator of the correlation function I is very small, it is not appropriate to utilize the output signal from the comparator 58 as a signal representing the lens position in the vicinity of the in-focus state as the correlation function output I may contain as elevated amount of error. For this reason a comparator 65 identifies if the denominator is larger or smaller than a determined level Vf4 to provide a high-level signal when the denominator is smaller than said determined level Vf4, said high-level signal indicating that the output signal from the comparator 58 for indicating the presence of the lens in the vicinity of the in-focus position thereof may be erroneous. Also, a high-level signal from an OR gate 66 represents that at least one of the phase difference $\phi1-\phi1'$ or $\phi2-\phi2'$ or the correlation output signal I is erroneous.

In the present embodiment, there are employed two phase differences $\phi1-\phi1'$ and $\phi2-\phi2'$ for achieving a higher detecting accuracy, it is naturally possible also to use only one phase difference.

Also in the embodiment shown in FIG. 4 there is employed parallel output from the photodiodes, but it is possible to obtain a normalized correlation output $\Sigma|fn-fn'|$ by applying an automatic gain control (AGC) on the charge accumulating time of the photodiodes so as to maintain a constant value of $r1+r1'+r2+r2'$.

Now there will be explained a second embodiment of the present invention. In the apparatus of said second embodiment shown in FIG. 8 comprises photosensor arrays 5, 6 identical with those utilized in the foregoing first embodiment, a spatial frequency component extracting circuit 70 for extracting, from the electric outputs f1-f8, a first electric signal V1 including the phase information $\phi1$ and the magnitude information r1 and a second electric signal V2 including the phase information $\phi2$ and the magnitude information r2, and a circuit 80 for extracting, from the electric output signals f1'-f8', a first electric signal V1' including the information $\phi2$ and r2' and a second electric signal V2' including the information $\phi2'$ and r2'. An adder 112 adds the electric signals f1-f8 to generate a scalar output r0 representing the total amount of light received by the array 5, while an adder 113 adds the output signals f1'-f8' to generate a scalar output r0' representing the total amount of light received by the array 6. Subtractors 114 and 115 calculates the difference of the first electric signals V1 and V1' representing the first spatial frequency component and the difference of the second electric signals V2 and V2' representing the second spatial frequency component. Also a subtractor 116 calculates the difference of said scalars r0 and r0'. Absolute value circuits 117 and 118 respectively calculate the absolute values |V1-V1'| and |V2-V2'| of vectors V1-V1' and V2-V2' supplied from said subtractors 114 and 115.

Another absolute value circuit 119 determines the absolute value of the scalar output r0-r0' obtained from the subtractor 116. Adder 120 adds the output signals from the circuits 117, 118 and 119 to generate a correlation output signal |V1-V1'|+|V2-V2'|+|r0-r0'|. Absolute value circuits 121, 122, 123 and 124 calculate respectively the absolute values or vector magnitudes |V1|=r1, |V2|=r2, |V1'|=r1' and |V2'|=r2' of the first and second electric signals V1, V1', V2 and V2'. An adder 125 adds the output r1, r2, r1' and r2' obtained from said circuits 121-124.

The above-mentioned output signals |V1-V1'|, |V2-V2'| and |r0-r0'| are related to the in-focus position of the objective lens 1 in such a manner that said output signals become minimum or ideally zero in case the objective lens is focused to the object and become larger according to the displacement of said objective lens from the in-focus position thereof. However it is to be noted that said output signals are also dependent on the sharpness of the light images. Therefore the correlation output signals |V1-V1'|, |V2-V2'| and |r0-r0'| are changed in response to the amount of lens displacement from the in-focus position thereof and also in response to the sharpness of the light images.

On the other hand, the output signals r1, r2, r1' and r2' are also dependent on the sharpness of the light images in a similar manner as already explained with respect to the output signals |V1-V1'|, |V2-V2'| and |r0-r0'|. Consequently it is possible to obtain a correlation output signal T scarcely dependent on the sharpness of the light images by dividing the correlation output signal from the adder 120 by the sharpness output signal from the adder 125, or in other words dividing the correlation output signal |V1-V1'|+|V2-V2'|+|r0-r0'| by the normalizing factor $r1+r2+r1'+r2'$ representing the image sharpness.

In the present embodiment, the normalized correlation output signal T is selected as:

$$T=(|V1-V1'|+|V2-V2'|+|r0-r0'|)/(r1+r1'+r2+r2')$$

but it is not limited to the above-mentioned form but can also be constructed from either one of the first and second correlation output signals |V1-V1'| and |V2-V2'| respectively containing first and second spatial frequency components and a corresponding normalizing factor.

For example, there can be employed the following function;

$$T=|V1-V1'|/(r1+r1') \text{ or}$$

$$T=|V2-V2'|/(r2+r2')$$

Furthermore the correlation signal may be based on a spatial frequency component other than the first and second spatial frequency components. A normalized correlation signal based on a particular spatial frequency component is advantageous in enabling a significantly simplified circuit structure, but is associated with the following drawbacks in comparison with the normalized correlation signal based on plural spatial frequency components as employed in the present embodiment.

Although the correlation signal based on a spatial frequency component is unable to provide the correlation output signal in case said spatial frequency component is not or scarcely contained in the light image, but such drawback can be avoided in case of a correlation output signal based on plural spatial frequency components, which allows appropriate correlation output signal from almost any object to be obtained. In addition, as already explained with reference to FIGS. 6A and 6B, there exists a danger of erroneous detection in case the light image on the array 5 is displaced with respect to that on the array 6 by an amount corresponding to the spatial period d or d/2. However, the correlation output signal $|r0-r0'|$ representing the absolute difference between the total amounts of light received by the arrays seldom becomes equal to zero except at the in-focus position and can be obtained from a simple circuit. It is therefore advantageous, in order to prevent the above-explained drawback, to combine the correlation output signal based on a spatial frequency component and the correlation output signal based on the total amount of light, such as:

$$T=(|V1-V1'|+|r0-r0'|)/(r1+r1').$$

The normalization in obtaining the normalized correlation output signal from plural spatial frequency components can also be achieved in the following manner:

$$T=|V1-V1'|/(r1+r1')+[|V2-V2'|+|r0-r0'|]/(r2+r2')$$

Although in the foregoing equation, the correlation output signal $|r0-r0'|$ is added to the correlation output signal $|V2-V2'|$ of the second spatial frequency component, it may also be added to the correlation output signal $|V1-V1'|$ of the first spatial frequency component or to both, or also be handled as an independent term as will be explained in relation to the equation (2).

Furthermore, in obtaining the normalized correlation output signal based on plural information, there may be employed weighting factors k, h as shown in the following equations:

$$T=[k1|V1-V1'|+k2|V2-V2'|+k0|r0-r0'|]/[h1(r1+r1')+h2(r2+r2')] \quad (1)$$

or $$T=(k1|V1-V1'|)/(r1+r1')+k2|V2-V2'|/[(r2+r2')+k0|r0-r0'|] \quad (2)$$

As the outputs r0 and r0' related to the total amount of light received by the arrays are generally larger than other signals V1, V1', V2, V2', r1, r1', r2 and r2'. it is advantageous to select the weighting factor k0 smaller than other weighting factors.

Figure 8:
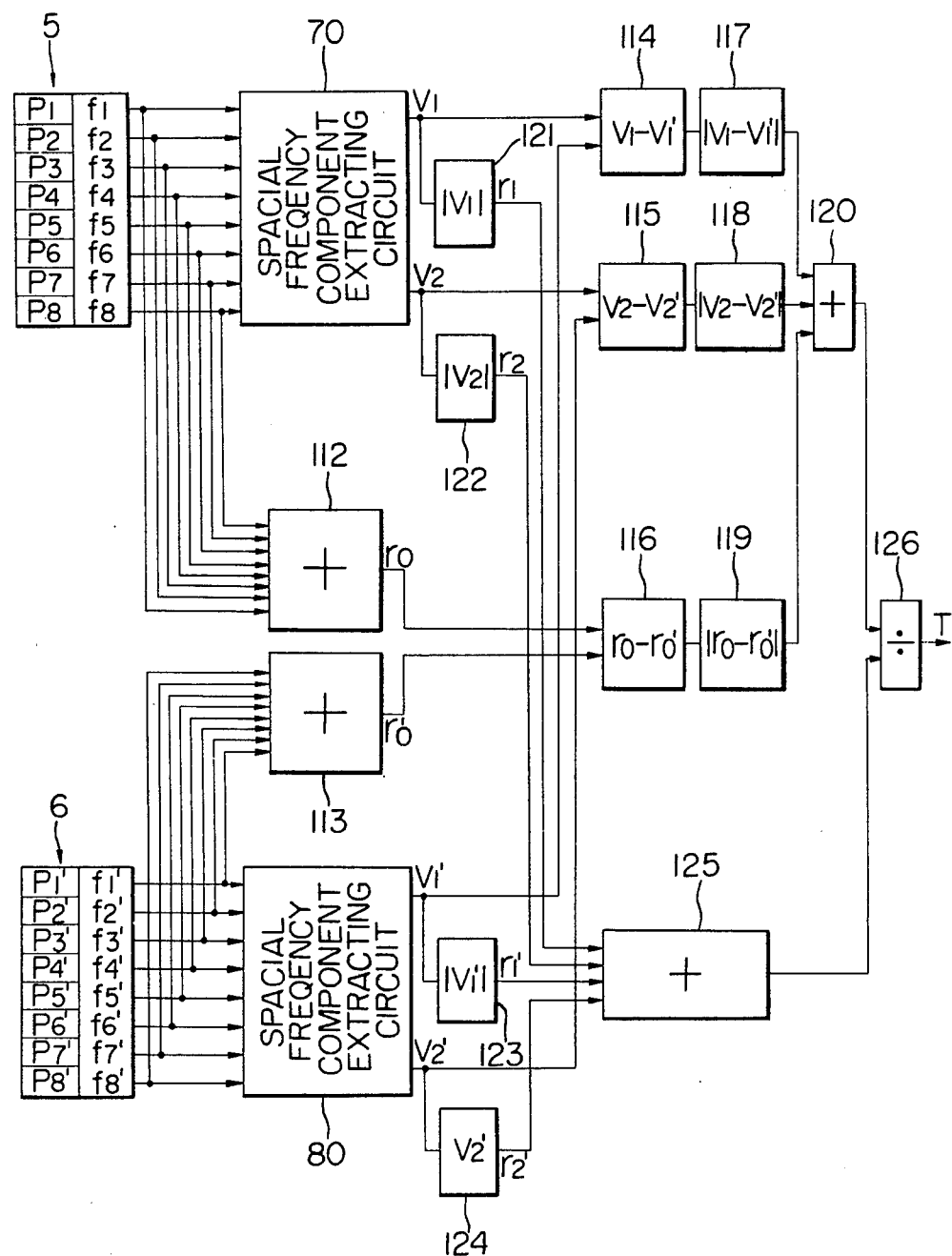
FIG. 8 is a block diagram showing a signal processing circuit of a second embodiment of the present invention.
Figure 9A:
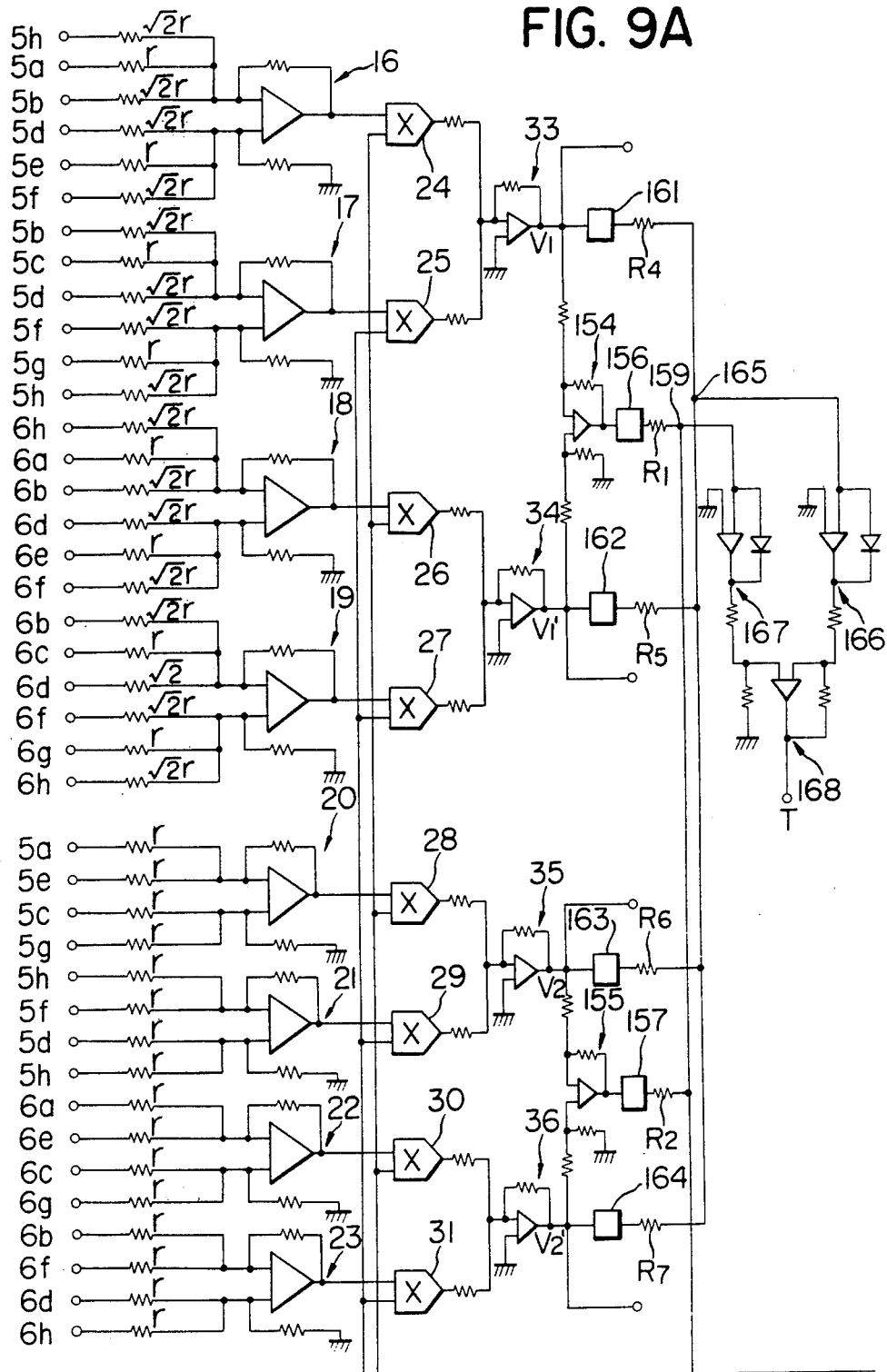
FIGS. 9, 9A and 9B illustrate a circuit diagram showing the circuit composition of the second embodiment.
Figure 9B:
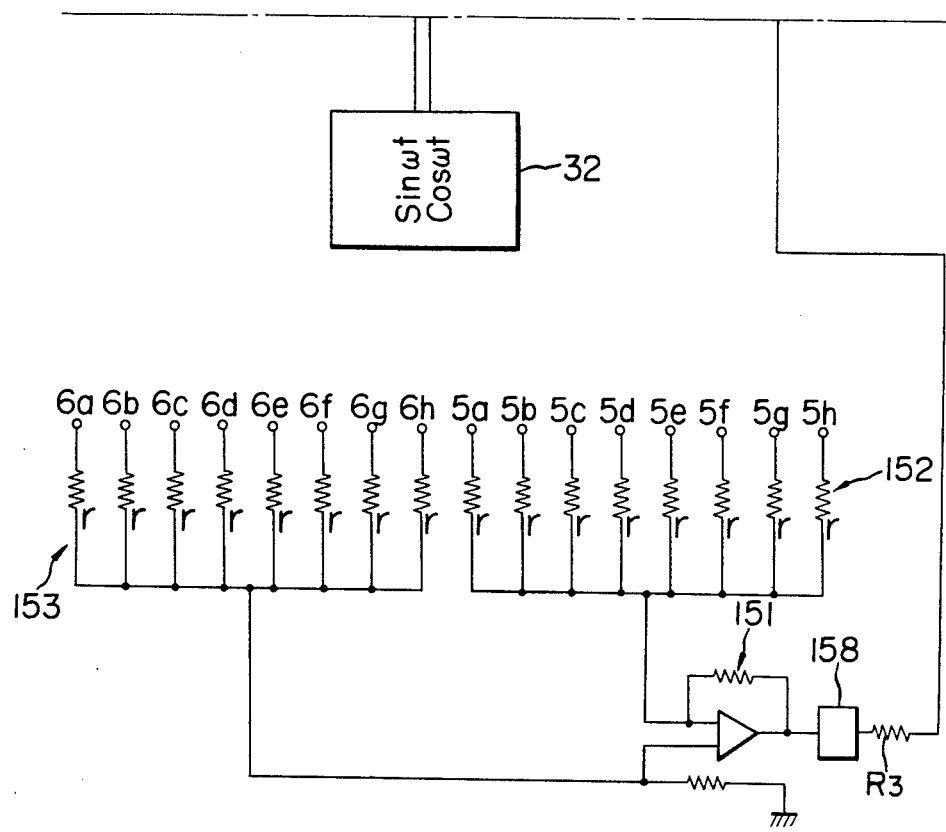
Figure 9:
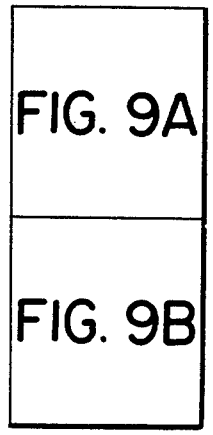

FIG. 9 shows the details of a specific example of the circuit shown as a block diagram in FIG. 8.

The circuit shown in FIG. 9 comprises terminals 5a–5h and 6a–6h, a vectorizing circuit, differential amplifiers 16–19 respectively generating the x- and y-components of the first electric signal V1 and the x- and y-components of the signal V1' related to the spatial frequency component of a spatial period d, differential amplifiers 20–23 respectively generating the x- and y-components of the second electric signal V2 and the x- and y-components of the signal V2' related to the spatial frequency component of a spatial period d/2, multipliers 24–31 for multiplying the signals from the differential amplifiers 16–23 with the AC output signal represented by cos ωt and sin ωt supplied through a circuit 32, and adders 33–36. Said adders 33, 34, 35 and 36 respectively provide AC output signals which correspond to the first electric signals V1 and V1' and to the second electric signals V2 and V2', having the aforementioned phases φ1, φ1', φ2 and φ2' and the amplitudes r1, r1', r2 and r2'.

In the circuit shown in FIG. 9, the extracting circuit 7 in FIG. 2 is composed of the circuits 16, 17, 20, 21, 24, 25, 28, 29, 32, 33 and 35, while the extracting circuit 8 is composed of the circuits 18, 19, 22, 23, 26, 27, 30, 31, 32, 34 and 36.

A differential amplifier 151 is connected at input terminals 5a–5h to eight parallel resistors 153 and at the other input terminals 6a to 6h to eight parallel resistors 153.

The circuits 112, 113 and 116 shown in FIG. 8 are composed of said amplifier 151 and a pair of eight parallel resistors 152 and 153. Said amplifier 151 generates the output signals r0–r0'.

Differential amplifiers 154, 155 correspond to subtractor 114, 115 shown in FIG. 8 to produce subtraction signals V1–V1' and V2–V2'.

Also rectifier smoothing circuit 156, 157 and 158 respectively rectify and smooth the output signals from the amplifiers 154, 155 and 151 to obtain correlation output signal $|V1-V1'|$, $|V2-V2'|$ and $|r0-r0'|$.

The output signals of rectifier smoothing circuits 156, 157 and 158 are weighted by factors k1, k2 and k0 by means of the resistors R1, R2 and R3 and added at a junction point 159. In this manner there is obtained a correlation output signal: $k1|V1-V1'|+k2|V2-V2'|+k0|r0-r0'|$, corresponding to the foregoing adder 120.

Also rectifier smoothing circuits 161, 162, 163 and 164 respectively rectify and smooth the electric signals V1, V1', V2 and V2' to provide the output signals r1, r1', r2 and r2', which are added at a junction point 165 after weighting with resistors R4–R7. In this manner there is generated a signal indicating $h1(r1+r1')+h2(r2+r2')$.

The divider 126 shown in FIG. 8 is composed of logarithmic circuits 166, 167 and a differential amplifier 168. The amplifier 168 provides an output corresponding to the logarithm of said normalized correlation output signal T according to the equation (1), since the circuit 166 provides an output representing $h1(r1+r1')+h2(r2+r2')$ while the amplifier 167 provides an output signal representing the logarithm of $(k1|V1-V1'|+k2|V2-V2'|+k0|r0-r0'|)$.

In the foregoing embodiments the vectors V1, V1', V2 and V2' are at first obtained as AC signals, which are then rectified to give the absolute value thereof, it is also possible to obtain said vectors in the form of x- and y-components from which the absolute value of said vectors can be obtained. For example, supposing that the outputs of the amplifiers 16 and 17 representing the x- and y-components of the vector V1 are represented by V1x and V1y and that the outputs of amplifiers 18 and 19 representing the x- and y-components of the vector V1' are represented by V1x' and V1y', r1 and $|V1-V1'|$ can be determined as follows:

$$r1=|V1|=(V1x^2+V1y^2)^{\frac{1}{2}}$$

$$|V1-V1'|=\{(V1x-V1x')^2+(V1y-V1y')^2\}^{\frac{1}{2}}$$

Furthermore, in the foregoing embodiments the electric signals are obtained by logarithmic amplification of the photoelectric outputs, but in case of utilizing linearly amplified photoelectric signals as the electric output signals, it is desirable to normalize $|r0-r0'|$ and to employ a ratio $|r0-r0'|/(r0+r0')$.

The structure shown in the second embodiment in relation to the correlation calculation allows to utilize the various circuits for phase detection as well as for the correlation output signals and for the normalizing factor, thereby simplifying the entire circuit structure.

We claim:

1. A focus detecting apparatus provided with a pair of first and second photosensor arrays each having plural photosensor elements arranged in a determined direction; and optical means for projecting light images of the same object onto said first and second photosensor arrays and modifying at least one of the relative position of the first photosensor array with respect to the light image thereon and the relative position of the second photosensor array with respect to the light image thereon in response to the change of the focal position of an objective lens, whereby the focus state of said objective lens is detected from the relationship between said two relative positions, the improvement comprising:
   (a) first means for forming phase outputs from said first and second photosensor arrays of phases respectively corresponding to the relative positions of said first and second photosensor arrays with respect to the light images thereon;
   (b) second means for comparing the output corresponding to the amount of light entering said first photosensor array with the output corresponding to the amount of light entering said second photosensor array and forming an output corresponding to said comparison;
   (c) third means for forming outputs according to the magnitude of variation of the amount of light caused by said light image in said direction of said arranged plural photosensor elements; and
   (d) processing means for generating a synthesized output signal representing the focus state of said objective lens with respect to the object from the outputs of said first, second and third means.

2. An apparatus according to claim 1, wherein said first means comprises:
   (a) first spatial frequency component extracting means for forming an electric signal representing at least a spatial frequency component in the light image formed on said array from the output of said first photosensor array; and
   (b) second spatial frequency component extracting means for forming an electric signal representing a spatial frequency component similar to the aforementioned spatial frequency component of the light image formed on said array from the output of said second photosensor array.

3. An apparatus according to claim 1 or 2, wherein said photosensor array is arranged in such a manner that each of the photosensor elements of said first array receives the same image as that received by each photosensor element of the second photosensor array when the objective lens is in the in-focus state, and the aforementioned output corresponding to said comparison is prepared from the total of absolute values of the output differences of mutually corresponding photosensor elements in said first and second photosensor array.

4. An apparatus according to claim 1, wherein said third means comprises:
   (a) means for calculating the absolute value of the output difference between the mutually adjacent photosensor elements in each of the first and second photosensor arrays; and
   (b) means for generating the total sum of absolute values thus calculated.

5. An apparatus according to claim 2, wherein said second means comprises first calculating means for calculating the absolute value of the difference between the electric signal from said first spatial frequency component extracting means and the electric signal from said second spatial frequency component extracting means.

6. An apparatus according to claim 5, wherein said first and second spatial frequency component extracting means are respectively adapted for generating plural electric signals representing plural spatial frequency components of mutually different spatial frequencies, and said second means is adapted for calculating the absolute value of the difference between the electric signal representing a similar spatial frequency component and plural electric signals of said first and second spatial frequency component extracting means.

7. An apparatus according to claim 6, wherein said second means further comprises:
   (a) a circuit for generating a signal representing the total amount of light entering said first photosensor array;
   (b) a circuit for generating a signal representing the total amount of light entering said second photosensor array;
   (c) second calculating means for calculating the absolute value of the difference between the output signals from the above-mentioned circuits; and
   (d) means for adding the outputs of said first and second calculating means.

8. An apparatus according to claim 6, wherein said third means comprises:
   means for calculating the absolute value of each of the outputs of plural electric signals prepared by said first and second spatial frequency extracting means; and
   adding means for generating the total sum of the output of said calculating means.

9. An apparatus according to claim 8, wherein said processing means comprises means for comparing the output of said aforementioned adding means of the second means, with the output of said adding means of the third means.

* * * * *

UNITED STATES PATENT AND TRADEMARK OFFICE
CERTIFICATE OF CORRECTION

PATENT NO. : 4,336,450
DATED : June 22, 1982
INVENTOR(S) : KEN UTAGAWA, ET AL.

It is certified that error appears in the above-identified patent and that said Letters Patent are hereby corrected as shown below:

Column 5, lines 43 - 46, in the formula set forth at line 46, the last expression "$f_{n+1}$" should read --$f_{n+1}'$--

Signed and Sealed this

Twenty-fourth Day of August 1982

[SEAL]

Attest:

GERALD J. MOSSINGHOFF

Attesting Officer     Commissioner of Patents and Trademarks